(12) United States Patent
Farrugia et al.

(10) Patent No.: US 10,216,111 B2
(45) Date of Patent: Feb. 26, 2019

(54) ANTIMICROBIAL SULFONATED POLYESTER RESIN

(71) Applicant: Xerox Corporation, Norwalk, CT (US)

(72) Inventors: Valerie M Farrugia, Oakville (CA); Alana R Desouza, London (CA); Sandra J Gardner, Oakville (CA); Wendy Chi, North York (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/706,048

(22) Filed: May 7, 2015

(65) Prior Publication Data

US 2016/0326337 A1 Nov. 10, 2016

(51) Int. Cl.

| G03G 9/093 | (2006.01) |
| C08K 3/015 | (2018.01) |
| G03G 9/087 | (2006.01) |
| C08J 3/12 | (2006.01) |
| C08K 3/08 | (2006.01) |

(52) U.S. Cl.
CPC .......... G03G 9/09385 (2013.01); C08J 3/128 (2013.01); C08K 3/015 (2018.01); G03G 9/08755 (2013.01); G03G 9/08791 (2013.01); G03G 9/08797 (2013.01); G03G 9/09342 (2013.01); G03G 9/09371 (2013.01); *C08J 2367/02* (2013.01); *C08K 2003/0806* (2013.01)

(58) Field of Classification Search
CPC . G03G 9/09385; G03G 9/09342; C08J 3/128; C08K 3/005; C08K 2003/0806
See application file for complete search history.

(56) References Cited

U.S. PATENT DOCUMENTS

| 6,214,508 | B1 * | 4/2001 | Kamada | H05K 3/102 |
| | | | | 430/106.1 |
| 2007/0077510 | A1 * | 4/2007 | Nosella | G03G 9/0804 |
| | | | | 430/109.4 |
| 2007/0188275 | A1 * | 8/2007 | Wakabayashi | H01P 11/003 |
| | | | | 333/238 |
| 2007/0207400 | A1 | 9/2007 | Ahuja et al. | |
| 2008/0122881 | A1 * | 5/2008 | Iftime | G06K 19/067 |
| | | | | 347/9 |
| 2009/0047591 | A1 * | 2/2009 | McDougall | G03G 9/08728 |
| | | | | 430/109.3 |
| 2009/0075196 | A1 | 3/2009 | Matsubara et al. | |
| 2010/0255281 | A1 * | 10/2010 | Cockman | C08K 3/005 |
| | | | | 428/220 |
| 2011/0062389 | A1 * | 3/2011 | Wang | H01B 1/22 |
| | | | | 252/514 |
| 2012/0128996 | A1 * | 5/2012 | Kwon | B22F 1/0018 |
| | | | | 428/577 |
| 2012/0202148 | A1 * | 8/2012 | Veregin | G03G 9/093 |
| | | | | 430/108.1 |
| 2013/0071143 | A1 | 3/2013 | Blanton et al. | |
| 2016/0215104 | A1 * | 7/2016 | Farrugia | C09D 7/1291 |
| 2017/0290329 | A1 * | 10/2017 | Ahmad | C08K 3/08 |
| 2017/0298194 | A1 * | 10/2017 | Farrugia | A01N 25/28 |
| 2017/0298232 | A1 * | 10/2017 | Farrugia | C08K 3/08 |

OTHER PUBLICATIONS

English language machine translation of CN 101812181 (Aug. 2010).*
"Ion": IUPAC. Compendium of Chemical Terminology, 2nd ed. (the "Gold Book"). Compiled by A. D. McNaught and A. Wilkinson. Blackwell Scientific Publications, Oxford (1997). Retrieved from https://doi.org/10.1351/goldbook.I03158 on Dec. 19, 2017.*
Morones-Ramirez et al., "Silver Enhances Antibiotic Activity Against Gram-negative Bacteria," NIH Public Access Author Manuscript, published in final edited form as: Sci Transl Med. Jun. 19, 2013; 5(190): 190ra81.doi:101126/scitranslmed.3006276, pp. 1-21.
Acevedo-Parra et al., "Synthesis by Emulsion Polymerization of Poly(butyl acrylate-co-silver acrylate) Ionomers and Evaluation of their Possible Applications," Journal of Macromolecular Science, Part A: Pure and Applied Chemistry (2012), 49, pp. 876-884.

* cited by examiner

*Primary Examiner* — Christopher D Rodee
(74) *Attorney, Agent, or Firm* — MH2 Technology Law Group LLP

(57) ABSTRACT

Toner particles contain a core-shell resin particle containing at least one (sulfo) polyester containing a metal on nanoparticle, and a shell containing a metal ion nanoparticle.

14 Claims, No Drawings

ANTIMICROBIAL SULFONATED POLYESTER RESIN

FIELD

The disclosure relates to antimicrobial toner particles comprising a sulfonated polyester resin comprising a metal ion, and a metal ion dispersed therein and thereon.

BACKGROUND

Noble metal ions, such as, silver and gold ions, are known to be antimicrobial and have been used in medical care to prevent and to treat infection. In recent years, that technology has been applied to consumer products to prevent transmission of infectious disease and to kill harmful bacteria, such as, *Staphylococcus* and *Salmonella*. In common practice, noble metals, metal ions, metal salts or compounds containing metal ions having antimicrobial properties can be applied to surfaces to impart an antimicrobial property to the surface. If, or when, the surface is inoculated with harmful microbes, the antimicrobial metal ions or metal complexes, in effective concentration, will slow or prevent growth of those microbes.

In the context of antimicrobial coatings, colloidal silver has been indicated to work as a catalyst disabling a metabolic enzyme of bacteria, fungi and viruses. Many pathogenic organisms can be eradicated effectively in presence of even minute traces of silver. Indeed, colloidal silver is effective against more than 650 different disease-causing pathogens. Unlike antibiotics, strains resistant to silver have yet to be identified.

There remains a need for printed products to be antimicrobial. Toner is used for printing labels, security marks, clear coats and other applications on 2-dimensional surfaces or structures; and toner-like compositions are used to create structures and devices in 3-dimensional applications.

The use of organic biocide in materials, such as polymers, inks, toners etc. is known (U.S. Pat. No. 6,210,474), however, those biocide agents do not demonstrate antimicrobial effectiveness for the printed or, "coated," state, such as, in printed ink or toner. Those biocide agents are used generally as a preservative of the material, e.g. polymer, prior to use in preparation of inks and toners. An ineffective amount of the agent is present in the final ink or toner product, insufficient to impart antimicrobial activity to the printed image.

Microorganisms, which include but are not limited to, bacteria, fungi or algae, for example, can be obtained from typical handling of objects; and airborne microbes (sneezing, coughing or other forms of aerosolization) can be spread by vectors, carriers and infected hosts. Hence, images containing, antimicrobial toner would be useful in, for example, restaurants (menus), businesses (legal documents) and hospitals (charts, memos, pictures, labels and devices).

Therefore, new antimicrobial toner particles are needed for forming coatings, images or devices, wherein contact of microbes with the image, coating or device inhibits growth of and/or is toxic to the microbes.

SUMMARY

The instant disclosure describes resin particles comprising, a sulfonated polyester resin comprising a metal ion nanoparticle, optionally, comprising a shell on those particles, where the shell comprises a metal nanoparticle on the surface of that resin particle. Metal nanoparticles also can be deposited on the surface of a toner core particle. In embodiments, the metal ion nanoparticles comprise silver nanoparticles (AgNP's). Metal ions impart an antimicrobial property to resulting resin particles, toner particles comprising said resin particles as well as the images and structures formed with toner comprising said resin particles.

In embodiments are provided methods for preparing toner particles wherein emulsion aggregation toner particles are formed with a sulfopolyester-metal composite resin, and optionally comprising a wax, colorant and/or shell. In embodiments are provided methods for preparing toner particles wherein emulsion aggregation toner particles are formed with a sulfopolyester resin comprising a metal, and optionally comprising a wax, a colorant and/or a surfactant. Following toner core particle formation, a shell comprising a metal nanoparticle can be added to the surface of the toner core particle using a solution comprising metal ions, such as, a silver salt, and a reducing agent, a (sulfo)polyester comprising a metal or both.

In embodiments are provided methods of forming an antimicrobial printed image or structure, comprising applying toner particles of interest to a surface or to a substrate. Substrates include any two-dimensional surface or structure, including, but not limited to paper, plastic, textile, ceramic, wood, rock or metal, wherein the antimicrobial printed image is affixed to a menu, a medical device, a medical equipment, a food package or packaging, cosmetic packaging, a cosmetic product, a food preparation product, a kitchen product, heating or cooling ductwork, a building material, an insulation product or a clean room surface. Accordingly, the antimicrobial printed image may be a printed code, a printed text, a printed logo or forms an antimicrobial coating over the substrate. In embodiments, a toner of interest is used to create a structure of a device.

DETAILED DESCRIPTION

A) Introduction

The present disclosure provides toner particles with antimicrobial properties, even after fused to a substrate or bonded in a structure, wherein the toner particles of interest comprise resin particles comprising a sulfo(polyester) resin comprising a metal ion, and optionally a shell comprising metal nanoparticles on the core resin particle. In embodiments, metal ion nanoparticles are combined with (sulfo)polyester resin to form resin particles. In embodiments, metal ion nanoparticles are deposited on the surface of resin particles. In embodiments, metal ion nanoparticles are included in a shell of a formed toner particle core. In embodiments, metal ion nanoparticles are deposited on the surface of toner particles. The metal ion nanoparticles can be formed during a reduction reaction with a metal ion source and a reducing agent.

Silver nanoparticles (AgNP's) are known for antimicrobial properties, however, the exact mechanism of antimicrobial activity using AgNP's is understood poorly. AgNP's may interact with the cell wall of bacteria, consequently destabilizing plasma membrane potential and reducing levels of intracellular adenosine triphosphate (ATP) resulting in cell death (Mukherjee et al., Theranos 2014; 4(3):316-335). Alternatively, AgNP's may play a role in formation of reactive oxygen species (ROS) which are responsible for cytotoxicity of cells. Furthermore, AgNP's have been reported to be catalysts in chemical reduction-oxidation reactions by facilitating electron transfer between an electron donor and electron acceptor.

In embodiments, the AgNP's may comprise solely elemental silver or may be a silver composite. Composites are useful for imparting additional antimicrobial properties, such as, a silver/copper composite wherein copper imparts antifungal properties. Other materials can comprise a composite, such as, an anion, a carrier and so on.

Methods for synthesizing metal nanoparticles are known, including composite nanoparticles. No limitation is intended on the method of synthesizing metal nanoparticles for preparation of the present resin particles. In embodiments, metal nanoparticles are synthesized by reduction of a source of metal ions, such as, silver nitrate. Silver salts are a common precursor for synthesis of silver nanoparticles. In that instance, a reducing agent, such as, trisodium citrate dihydrate, is added to a heated solution of silver salt, such as, silver nitrate, whereby silver nanoparticles are formed.

Following formation of core resin particles or core toner particles, particles are heated and a solution of a metal ion source added thereto followed by a reducing agent. The result of that chemical process is formation of metal nanoparticles deposited at or on the surface of resin particles or toner particles, see Examples 7 and 8, to form core-shell particles.

In embodiments, a method is provided of forming an antimicrobial image, coating or structure, wherein toner is printed, on any two-dimensional surface or substrate; or used to form a three-dimensional structure or device. An antimicrobial printed toner may form a coating over a surface or a substrate or an antimicrobial printed image may form a printed code, a printed image, a printed text or a printed logo. An antimicrobial printed image may be affixed to a menu, a label, a medical device, a medical equipment, a food package or packaging, a cosmetic, a cosmetic package or packaging, a drug, a drug packaging, a cosmetic product, a food preparation product, a food, a kitchen product, heating or cooling ductwork, a building material, an insulation product, a clean room surface and so on. In embodiments, the present toner may be used to form codes/labels/logos on a medical device (a catheter or a thermometer, for example), a menu, a label, a food packaging material, a cosmetic tool etc., or can be used as a clear antimicrobial coat. The present toner may be used to form a structure or a device.

As provided in the Example section, a sulfonated polyester-based toner was made which contained silver nanoparticles within, in and on the resin particle, and optionally, on the surface of the resin particles. Toner made with a sulfonated polyester comprising a metal is antimicrobial when transferred and, "fused," to filters and then plated on agar-containing petri dishes inoculated with bacteria. To mimic fusing toner to a substrate, dried toner/substrate was laminated at from about 55° C. to about 120° C. which demonstrated antimicrobial activity around the print (seen as a halo or no bacteria growth about the toner on the bacteria lawn) and the print did not show evidence of bacterial growth thereon or toner degradation. The results demonstrate a practical use of the toner for forming antimicrobial images, coatings or surfaces on a variety of structures, or for forming structures.

B) Definitions

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range, "from about 2 to about 4," also discloses the range, "from 2 to 4."

The term, "antibacterial," as used herein refers to the property of a composition for inhibiting or destroying the growth of bacteria. In other words, a toner particle comprising antibacterial properties is effective in killing bacteria, or in inhibiting growth or propagation of bacteria, including as a printed or fused image, or as a bonded or aggregated structure or device.

The term, "antimicrobial," as used herein refers to an agent, or the property imparted by the agent, that kills or inhibits growth of microorganisms or microbes. An antibacterial agent, or property thereof, is an antimicrobial agent. Microorganisms include, for example, bacteria, fungi, algae, other single celled organisms, protists, nematodes, parasites, other multicellular organisms, other pathogens and so on. In other words, a toner particle comprising antimicrobial properties is effective in killing microbes, or in inhibiting growth and propagation of microbes, including as a printed and fused image, or as a bonded or aggregated structure or device.

The term, "nano," as used in, "silver nanoparticles," indicates a particle size of less than about 1000 nm. In embodiments, the silver nanoparticles have a particle size of from about 0.5 nm to about 1000 nm, from about 1 nm to about 500 nm, from about 1 nm to about 100 nm, from about 1 nm to about 20 nm. The particle size is defined herein as the average diameter of the silver nanoparticles, as determined by, for example, transmission electron microscopy (TEM).

A polymer can be identified or named herein by the one or more of the constituent monomers used to construct the polymer, even though following polymerization, a monomer is altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester. A monomer is a reagent for producing a polymer and thus, is a constituent and integral part of a polymer, contributing to the backbone or linear arrangement of chemical entities covalently bound to form a chain of chemical moieties and that comprise a polymer.

By, "two dimension," or grammatic forms thereof, such as, 2-D, is meant to relate to a structure or surface that is substantially without measurable or discernible depth, without use of a mechanical measuring device. Generally, the surface is identified as flat, and emphasizes height and width, and lacks the illusion of depth or thickness. Thus, for example, toner is applied to a surface to form an image or coating and generally, that layer of fused toner is from about 1 μm to about 10 μm in thickness. Nevertheless, that application of toner to a flat surface is considered herein as a two dimensional application. The surface can be a sheet or a paper for example. This definition is not meant to be a mathematic or scientific definition at the molecular level but one which to the eye of the viewer or observer, there is no illusion of thickness. A thicker layer of toner, such as one which might be identified as providing, "raised lettering," on a surface, is for the purposes herein, included in the definition of 2-D.

By, "three dimension," or grammatic forms thereof, such, as, 3-D is meant to relate to a structure composed of plural layers or particle depositions of toner that aggregate or assemble to yield a form, a shape, a construct, an object and the like that, for example, need not be applied to a surface or structure, can be autonomous and/or has a thickness or depth. Printing as used herein includes producing 3-D structures. Printing on a surface or structure also is used herein to include forming a 3-D structure by deposition of plural layers of toner. Often, the first layer is printed on a support, surface, substrate, structure and so on. Successive layers of toner are placed thereon and the already deposited (and optionally adhered or solidified) toner layer or layers is considered herein a surface or a substrate.

As used herein, "sulfonate-free" is meant to indicate a compound or structure which does not contain a sultanate group. For example, a polymer or resin of interest contains a sulfonate group. A resin of interest that binds metal ion or metal ion nanoparticles comprises a reactive sulfonate group and can be identified herein as a, "(sulfo)polyester," polymer. Other known resins, such as, polystyrenes, polyacrylates, polyesters and so on can be configured to contain no sulfonate group. Those polymers can be classified as sulfonate-free because those polymers do not contain any sulfonate groups.

C) Toner Particles

The toner particles of interest comprise at least one (sulfo)polyester polymer and at least one metal ion nanoparticle. In embodiments, the toner particles comprise a (sulfo)polyester-metal nanoparticle composite resin particle, wherein a metal ion is reduced on and in the polyester polymer composite resin particle forming a core-shell resin particle.

In embodiments, the toner particles comprising the (sulfo) polyester particle comprising metal further comprise metal ion nanoparticles deposited on or at the surface of the toner particles forming a shell, where the metal ions are reduced or deposited to form metal ion nanoparticles on or at the surface of the toner core particle.

In embodiments, the toner particles comprise at least one other sulfonate-free polymer, such as, a polystyrene, polyacrylate, polyester and so on.

a) Metal Ion Nanoparticles

The resin particles of the present disclosure comprise a core particle comprising a sulfonated polyester and metal (I) ions. Silver metal ions are known to possess antimicrobial properties and may be referred to as an antimicrobial metal ion. Suitable antimicrobial metals and metal ions include, but are not limited to, silver, copper, zinc, gold, mercury, tin, lead, iron, cobalt, nickel, manganese, arsenic, antimony, bismuth, barium, cadmium, chromium and thallium. Metal ions of, for example, silver, copper, zinc and gold or combinations thereof are considered safe for human contact. Hence, silver ions, alone or in combination with copper or zinc or both, have a high ratio of efficacy to toxicity, i.e., high efficacy to low toxicity.

For example, a combination of silver and copper ions provides both an antibacterial property of silver ions and an antifungal property of copper ions. Thus, one is able to tailor the toner particles by selection of specific metal ions and combinations thereof incorporated into and on the core particle for particular end-use applications.

The particle size of metal nanoparticles can be determined by the average diameter of the particles. The metal nanoparticles may have an average diameter of about 100 nm or less, 20 nm or less. In embodiments, the metal nanoparticles have an average diameter of from about 1 nm to about 15 nm, from about 3 nm to about 10 nm. In embodiments, metal nanoparticles may have a uniform particle size with a narrow particle size distribution. The particle size distribution can be quantified using the standard deviation of the average particle size of a population. In embodiments, metal nanoparticles have a narrow particle size distribution with an average particle size standard deviation of about 3 nm or less, about 2.5 nm or less. In embodiments, metal nanoparticles have an average particle size of from about 1 nm to about 10 nm with a standard deviation of from about 1 nm to about 3 nm. Without being limited by theory, it is believed that small particle size with a narrow particle size distribution make the metal nanoparticles easier to disperse when placed in a solvent, and can offer a more uniform reaction with sulfonated resin.

In embodiments, metal nanoparticles have a particle size in a range from about 2 nm to about 50 nm, from about 10 nm to about 50 nm, from about 20 nm to about 50 nm.

In embodiments, silver nanoparticles may comprise solely elemental silver or may be a silver composite, including composites with other metals. Such silver composites may include either or both of (i) one or more other metals and (ii) one or more non-metals. Suitable other metals include for example Al, Au, Pt, Pd, Cu, Co, Cr, In and Ni, such as, the transition metals, for example, Au, Pt, Pd, Cu, Cr, Ni and mixtures thereof. Exemplary metal composites are Au—Ag, Ag—Cu, Au—Ag—Cu and Au—Ag—Pd. Suitable non-metals in the silver composite include, for example, Si, C and Ge. Various non-silver components of the silver composite may be present in an amount ranging, for example, from about 0.01% to about 99.9% by weight, from about 10% to about 90% by weight. In embodiments, a silver composite is a metal alloy composed of silver and one, two or more other metals, with silver comprising, for example, at least about 20% of the nanoparticle by weight, greater than about 50% of the nanoparticle by weight. Unless otherwise noted, the weight percentages recited herein for the components of the nanoparticles do not include a stabilizer.

Nanoparticles composed of a silver composite can be made, for example, by using a mixture of: (i) a silver compound (or compounds, such as, a silver (I) ion-containing compound); and (ii) another metal salt (or salts) or another non-metal (or non-metals) during a reduction step.

Those skilled in the art will appreciate that metals other than silver may be useful and can be prepared in accordance with methods disclosed herein and as known in the art. Thus, for example, composites may be prepared with nanoparticles of copper, gold, palladium or composites of such exemplary metals.

In embodiments, composites may comprise further nano-structured materials, such as, without limitation, a carbon nanotube (CNT, including single-walled, double-walled, and multi-walled), a graphene sheet, a nanoribbon, a nano-onion, a hollow nanoshell metal, a nanowire and the like. In embodiments, CNT's may be added in amounts that enhance electrical and thermal conductivity.

In embodiments are provided methods for preparing a resin comprising dissolving a (sulfo)polyester resin and a source of metal ions in water to form a mixture and optionally adding a solution of a reducing agent to the mixture thereby forming an emulsion of sulfonated resin to which is bound metal ions and metal nanoparticles. In embodiments, heating includes boiling the mixture. Metal ion can be found in a resin particle or attached to a resin, for example, bound to a sulfonate group and/or reduced onto or at sites of a polymer.

A source of silver (I) ion can be selected from silver nitrate, silver sulfonate, silver fluoride, silver perchlorate, silver lactate, silver tetrafluoroborate, silver oxide or silver acetate.

In embodiments, the source of silver (I) ion is a silver salt selected from silver acetylacetonate, silver benzoate, silver bromate, silver bromide, silver carbonate, silver chloride, silver citrate, silver iodate, silver iodide, silver nitrite, silver phosphate, silver sulfate, silver sulfide and silver trifluoroacetate. Silver salt particles can be fine for homogeneous dispersion in the water solution, which facilitates reaction.

In embodiments, a reducing agent is selected from ascorbic acid, trisodium citrate, glucose, galactose, maltose, lactose, gallic acid, rosmaric acid, caffeic acid, tannic acid, dihydrocaffeic acid, quercetin, sodium borohydride, potassium borohydride, hydrazine hydrate, sodium hypophosphite and hydroxylamine hydrochloride. Selection of an appropriate reducing agent may provide access to desirable nanoparticle morphologies.

In embodiments, metal ion nanoparticles, such as AgNP's, may be deposited on the surface of a resin particle. As described above, deposition can occur by a reduction reaction. Metal nanoparticles may cover the entire surface of a resin particle, essentially forming a shell and encapsulating the resin particle, or portions of the surface of a core resin particle. Hence, a reduced metal can encapsulate a core resin particle or can be found, for example, at sites on the surface of a core, as isolated patches of varying size, islands and so on. By encapsulate is meant a shell covers the entire surface of a resin particle. As disclosed hereinbelow, metal ion nanoparticles also can be deposited at the surface of a toner particle to the same degree.

In embodiments, metal ion nanoparticles are deposited on a surface of a resin particle by reducing a metal ion salt with a reducing agent. Metal ion nanoparticles include AgNP's wherein a metal ion salt may be any of those disclosed herein, including silver nitrate ($AgNO_3$), and a reducing agent may be any of those disclosed herein, including trisodium citrate.

Silver nitrate ($AgNO_3$) used to form AgNP's may be added to a resin slurry at from about 0.1% wt per polyester resin to about 20% wt per polyester resin, from about 1% to about 10% wt per polyester resin, from about 2% to about 5% wt per polyester resin.

In embodiments, total metal present in a resin can be at least about 27,500 ppm, at least about 28,500 ppm, at least about 29,500 ppm, or more, as measured, for example, by inductively coupled plasma (ICP) mass spectrometry (MS). In embodiments, total metal present in a resin can be at least about 2.75%, at least 2.95%, at least about 3%, at least about 3.5%, or more by weight of the resin, as measured by ICP-MS.

b) Resins and Latexes
i) (Sulfo)Polyester-Metal Ion Nanoparticle Composite Resin Embodiments herein provide methods of synthesizing metal nanoparticles by ionic interaction and by reduction of a metal ion source, with a sulfonated polyester resin. Reactions can occur in water or aqueous solutions thereby avoiding use of organic solvents. Methods require minimal time to prepare a polymer metal nanocomposite. Without being bound by theory, it is postulated metal ions are bound to sulfonate groups, reduced onto a polymer and/or are trapped within a polymer matrix during self-assembly of sulfonated polyester into particles. Thus, a metal can be bound to sulfonate groups located in and on a resin particle, while simultaneously being reduced to nanoparticles and attached to a polymer and polymer particle, and can be trapped within a resin particle. Metal sulfonated polyester complexes are synthesized simultaneously during self-assembly or dispersing of polymer in water. Thus, the sulfonated polyester serves as a carrier of metal ions, reactant with metal and an organic matrix for in situ synthesis of metal nanocomposites. A reducing agent can be added during self-assembly of sulfonated polyester to reduce metal into metal nanoparticles resulting in dispersed particles, which can be entrapped within forming resin particles. A polyester matrix may play a role by inhibiting agglomeration of metal nanoparticles. Meanwhile, porosity of a sulfonated polyester allows metal ions to diffuse and/or to absorb or to adsorb throughout the polymer matrix allowing unhindered interaction with sulfonate functional groups of a polyester. A reducing agent also freely diffuses throughout a polyester matrix and promotes formation of dispersed metal nanoparticles on the surface and in the interior of a polyester particle. Advantageously, the process minimizes nanoparticle agglomeration that plagues conventional methods with preformed nanoparticles. The sulfonated polymer matrix has an important role in keeping metal nanoparticles dispersed as well as maintaining overall chemical and mechanical stability of the composite.

Sulfonated polyester resins disclosed herein have a hydrophobic backbone while presenting hydrophilic sulfonate groups along the chain to the environment. Without being bound by theory, when placed in water and heated, hydrophobic portions may interact to form a hydrophobic core with hydrophilic sulfonate groups facing the surrounding water or solvent result in sulfonated polyester self-assembling into a higher order, spherical nanoparticle without requiring additional reagents. Thus, there is a higher order arrangement involving an amphiphilic polyester, in which the hydrophobic backbone, which is insoluble in water, and the water-soluble hydrophilic sulfonate groups, operate as macrosurfactants. That results in self-association, self-assembly, self-dispersible nanoparticles in an aqueous medium to yield micelle-like aggregates. Formation of metal nanoparticles within, in and on the micelles is a secondary occurrence on addition of metal and reducing agent.

In embodiments, there are provided composites comprising a sulfonated polyester resin, and a plurality of metal nanoparticles dispersed within, in and on the resin and resin matrix or particle.

In embodiments, a sulfonated polyester resin is a branched polymer. In embodiments, a sulfonated polyester resin is a linear polymer. Selection of branched or linear polymer may depend on inter alia, downstream toner design or other end uses of a composite resin. Linear polymers can be used to create strands of fibers or to form a mesh-like structure. Branched polymers may be useful to confer thermoplastic properties on the resultant composite material and toner.

Both linear amorphous and branched amorphous sulfonated polyester resins can be alkali sulfonated polyester resins. Alkali metal in the sulfonated polyester resins may be, independently, lithium, sodium or potassium. In embodiments, a sulfonated polyester matrix can be selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly(1,2-propylenediethylene-5-sulfoisophthalate)-copoly-(1,2- propylene-diethylene-terephthalateplithalate) and copoly (ethylene-neopentylene-5-sulfoisophthalate)-copoly-(ethylene-neopentylene-terephthalatephthalate).

A sulfonated polyester may have the following general structure, or copolymers thereof in which the n and p segments are separated.

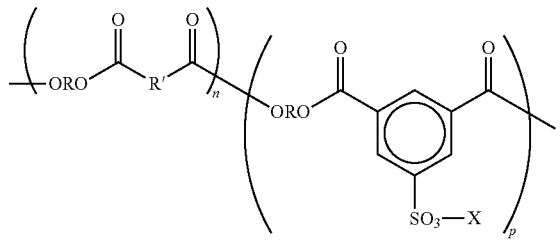

wherein R is alkylene of, for example, from 2 to about 25 carbon atoms, such as, ethylene, propylene, butylene, oxyalkylene diethyleneoxide and the like; R' is arylene of, for example, from about 6 to about 36 carbon atoms, such as, a benzylene, bisphenylene, bis(alkyloxy) bisphenolene and the like; p and n represent the number of randomly repeating segments, such as, for example, from about 10 to about 100,000; and X is a counterion, such as, for example, Na, K or Li.

Examples further include those disclosed in U.S. Pat. Nos. 6,348,561; 6,432,601; 6,664,015; 6,818,723; 7,425,398; and 7,312,011, each of which is incorporated herein by reference in entirety. Specific examples of amorphous sulfonated polyester resins include, but are not limited to, copoly (ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate) or copoly(propylene-butylene-terephthalate-copoly(propylene-butylene-5-sulfo-isophthalate).

Examples of crystalline alkali sulfonated polyester resins include alkali copoly(5-sulfoisophthaloyl)-co-poly(ethylene-adipate), alkali copoly(5-sulfoisophthaloyl)-copoly (propylene-adipate), alkali copoly(5-sulfoisophthaloyl)-co-poly(butylene-adipate), alkali copoly(5-sulfo-isophthaloyl)-copoly(pentylene-adipate), and alkali copoly(5-sulfo-iosphthalbyl)-copoly(octylene-adipate), alkali copoly(5-sulfo-isophthaloyl)-copoly(ethylene-adipate), alkali copoly (5-sulfo-isophthaloyl)-copoly (propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly (ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly (butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)copoly (hexylene-adipate) or poly(octylene-adipate), wherein alkali can be a metal, such as, sodium, lithium or potassium.

Polyester resins can be prepared by polycondensation of a polyol and a polyacid or polyester, one of which is sulfonated, optionally with a polycondensation catalyst. For a branched sulfonated polyester resin, the same materials may be used with further inclusion of a branching agent, such as, a multivalent polyacid or polyol.

Examples of polyacids or polyesters that also be incorporated include dicarboxylic acids of diesters selected from terephthalic acid phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate dimethylsuccinate, dimethylfumarate, dimethylmaleate, dimethylglutarate, dimethyladipate, dimethyl dodecylsuccinate or mixtures thereof. Polyacid or polyester is selected, for example, from about 45 to about 52 mole percent of the resin.

Examples of polyols that can be incorporated in a polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene or mixtures thereof. The amount of polyol selected can vary from about 45 to about 52 mole percent of the resin.

Alkali sulfonated difunctional monomers, wherein the alkali can be lithium, sodium or potassium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate 2-sulfo-3,3-dimethylpent-anediol, sulfo-p-hydroxybenzoic acid, mixtures thereof or the like.

Branching agents include, for example, a multivalent polyacid, such as, 1,2,4-benzene-tricarboxylic acid, 1,2,4-cyclohexanetricarboxylic acid, 2,5,7-naphthalenetricarboxylic acid 1,2,4-naphthalenetricarboxylic acid, 1,2,5-hexanetricarboxylic acid, 1,3-dicarboxyl-2-methyl-2-methylenecarboxylpropane, tetra(methylene-carboxyl)methane, 1,2,7,8-octanetetracarboxylic acid, acid anhydrides thereof and lower alkyl esters thereof, where alkyl can be from 1 to about 6 carbon atoms; a multivalent polyol, such as, sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof and the like. Branching agent amount selected is, for example, from about 0.1 to about 5 mole percent of the resin.

Polycondensation catalyst examples include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide or mixtures thereof. Catalysts are selected in amounts of, for example, from about 0.01 mole percent to about 5 mole percent based on the starting polyacid or polyester used to generate the polyester resin.

As used herein reference to, "particle size," generally refers to $D_{50}$ mass median diameter (MMD) or the lognormal distribution mass median diameter. The MMD is considered to be the average particle diameter by mass.

In embodiments, composite resin has a particle size in a range from about 5 nm to about 500 nm, from about 10 to about 200 nm, from about 20 to about 100 nm.

In embodiments, loading of metal is present in the composite resin in a range from about 27,000 ppm to about 40,000 ppm, from about 27,500 ppm (2.75%) to about 37,500 ppm (3.75%), from about 28,000 ppm (2.8%) to about 35,000 ppm (3.5%), from about 28,500 ppm to about 34,000 ppm, although the amount can be outside of those ranges so long as one greater than about 27,500 ppm.

ii) Optional Toner Resins

In embodiments, toner particles further may comprise a second polyester resin, which may or may not be sulfonated, and/or a styrene/acrylate resin.

Any polyester resin can be used, including resins described in U.S. Pat. Nos. 6,593,049 and 6,756,176, the entire disclosure of each of which herein is incorporated by reference in entirety. Polyesters may be amorphous, crystalline or both. Suitable amorphous resins include those disclosed in U.S. Pat. No. 6,063,827, the entire disclosure of which herein is incorporated by reference in entirety. Suitable crystalline resins include those disclosed in U.S. Publ. No. 2006/0222991, the entire disclosure of which herein is incorporated by reference in entirety. Suitable polyester latexes also may include a mixture of an amorphous polyester resin and a crystalline polyester resin as described in U.S. Pat. No. 6,830,860, the entire disclosure of which herein is incorporated by reference in entirety.

In embodiments, unsaturated polyester resin may be utilized as a polyester latex resin. Examples of such resins include those disclosed in U.S. Pat. No. 6,063,827, the entire disclosure of which herein is incorporated by reference in entirety. Exemplary unsaturated polyester resins include, but are not limited to, poly(1,2-propylene fumarate), poly(1,2-propylene maleate), poly(1,2-propylene itaconate) and so on, or combinations thereof.

A, "crystalline polyester resin," is one that shows not a stepwise endothermic amount variation but a clear endothermic peak in differential scanning calorimetry (DSC). However, a polymer obtained by copolymerizing a crystalline polyester main chain and at least one other component also is called a crystalline polyester if the amount of the other component is 50% by weight or less.

Monomer polyacids having 6 to 10 carbon atoms may be desirable for obtaining suitable crystal melting point and charging properties. To improve crystallinity, a straight chain polycarboxylic acid may be present in an amount of about 95% by mole or more of the acid component, more than about 98% by mole of the acid component. Other polyacids are not particularly restricted and examples thereof include conventionally known polycarboxylic acids and polyhydric alcohols, for example, those described in, "Polymer Data Handbook: Basic Edition," (Soc. Polymer Science, Japan Ed.: Baihukan). As alcohol component, aliphatic polyalcohols having from about 6 to about 10 carbon atoms may be used to obtain desirable crystal melting points and charging properties. To raise crystallinity, it may be useful to use the straight chain polyalcohols in an amount of about 95% by mole or more, about 98% by mole or more.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof and the like. Specific crystalline resins may be polyester based such as, poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate) or copoly(ethylene-fumarate)-copoly(ethylene-dodecanoate).

Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide) or poly(propylene-sebecamide).

Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) or poly(butylene-succinimide).

Crystalline resin may be present, for example, in an amount of from about 4 to about 14% by weight of toner components, from about 5 to about 12%, from about 6 to about 10% by weight of toner resins. Crystalline resin can possess various melting points of, for example, from about 30° C. to about 120° C., from about 50° C. to about 90° C. Crystalline resin may have a weight average molecular weight ($M_w$), as measured by gel permeation chromatography (GPC) of, for example, from about 15,000 to about 30,000, from about 20,000 to about 25,000. Molecular weight distribution ($M_w/M_n$) of a crystalline resin may be, for example, from about 2 to about 6, from about 3 to about 5. Crystalline resin particles can be from about 170 to about 230 nm in size, from about 180 to about 220 nm, from about 190 to about 210 nm in size.

High molecular weight (HMW) amorphous resin can have a molecular weight from about 70,000 (70 k) to about 84 k, from about 72 k to about 82 k, from about 74 k to about 80 k. Low molecular weight (LMW) amorphous resin can have a molecular weight from about 12 k to about 24 k, from about 14 k to about 22 k, from about 16 k to about 20 k.

Amorphous resin particles can be from about 170 to about 230 nm, from about 180 to about 220 nm, from about 190 to about 210 nm in size.

Total amount of amorphous resin in toner cores can be from about 75% to about 90% by weight of resins in a toner core.

Polyester resins may be synthesized from a combination of components selected from the above-mentioned monomer components, using conventional known methods. Exemplary methods include ester exchange and direct polycondensation, which may be used singularly or in combination. Molar ratio (acid component/alcohol component) when the acid component and alcohol component are reacted may vary depending on reaction conditions. Molar ratio usually is about 1/1 in direct polycondensation. In ester exchange, a monomer, such as, ethylene glycol, neopentyl glycol or cyclohexanedimethanol, which may be distilled away under vacuum, may be used in excess.

In embodiments, toner particles further comprise a styrene/acrylate resin. Any monomer suitable for preparing a styrene/acrylate latex for use in a toner may be utilized. Such latexes may be produced by conventional methods.

Suitable monomers include, but are not limited to, styrenes, acrylates, methacrylates, butadienes, isoprenes, acrylic acids, methacrylic acids, acrylonitriles, combinations thereof and the like. Exemplary monomers include, but are not limited to, styrene, alkyl acrylate, such as, methyl acrylate, ethyl acrylate, butyl acrylate, isobutyl acrylate, dodecyl acrylate, n-octyl acrylate, 2-chloroethyl acrylate; β-carboxy ethyl acrylate (β-CEA), phenyl acrylate, methyl α-chloroacrylate, methyl methacrylate (MMA), ethyl methacrylate and butyl methacrylate; butadiene; isoprene; methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; N-vinyl pyrrolidone; methacrylate (MA); acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, or mixtures thereof.

Exemplary styrene/acrylate polymers include styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly butyl methacrylate-butyl acrylate), poly(butyl methacrylate-acrylic acid), poly(acrylonitrile-butyl acrylate-acrylic acid) or combinations thereof. The polymer may be a block, random or alternating copolymer.

Other illustrative examples of a styrene/acrylate latex copolymer include poly(styrene-n-butyl acrylate-β-CEA), poly(alkyl methacrylate), poly(styrene-alkyl acrylate-actylonitrile), poly(styrene-1,3-diene-acrylonitrile), poly(alkyl acrylate-acrylonitrile), poly(styrene-butadiene-acrylonitrile), poly(styrene-butyl acrylate-acrylonitrile) or the like.

iii) Latexes

As discussed herein, any suitable surfactant may be used for preparation of a latex, pigment or wax dispersion according to the present disclosure. Depending on the emulsion system, any desired nonionic or ionic surfactant, such as, anionic or cationic surfactant, may be contemplated.

Examples of suitable anionic surfactants include, but are not limited to, sodium dodecylsulfate (SDS), sodium dodecylbenzene sulfonate, sodium dodecylnaphthalenesulfate, dialkyl benzenealkyl sulfates and sulfonates, abietic acid. NEOGEN R® and NEOGEN SC® available from Kao, TaycaPower, available from Tayca Corp., DOWFAX®, available from Dow Chemical Co., CALFAX® DB-45 (Pilot, Ohio) and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$-trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals) and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol (available from sanofi as ANTAROX 890®, IGEPAL CA-210®, IGEPAL CA-520®, IGEPAL CA-720®, IGEPAL CO-890®, IGEPAL CO-720®, IGEPAL CO-290®, IGEPAL CA-210® and ANTAROX 897®) and the like, as well as mixtures thereof.

Surfactants may be employed in any desired or effective amount, for example, at least about 0.01% by weight of the reactants, at least about 0.1% by weight of the reactants, although the amount can be outside of that range.

An initiator or mixture of initiators may be used in a latex process and a toner process. In embodiments, an initiator can be selected from known free radical polymerization initiators. Examples of suitable free radical initiators include, but are not limited to, peroxides, pertriphenylacetate, tert-butyl performate, sodium persulfate, azo compounds and the like.

Based on total weight of monomers to be polymerized, an initiator may be present in an amount from about 0.1% to about 5%, although may be present in greater or lesser amounts.

A chain transfer agent optionally may be used to control polymerization degree of a latex, and thereby to control molecular weight and molecular weight distribution of product latexes. As can be appreciated, a chain transfer agent can become part of a latex polymer.

A chain transfer agent can have a carbon-sulfur covalent bond. A carbon-sulfur covalent bond has an absorption peak in a wave number region ranging from 500 to 800 $cm^{-1}$ in an infrared absorption spectrum. When a chain transfer agent is incorporated into a latex and a toner made from a latex, the absorption peak may be changed, for example, to a wave number region of 400 to 4,000 $cm^{-1}$.

Exemplary chain transfer agents include, but are not limited to, n-$C_{3-15}$ alkylmercaptans; branched alkylmercaptans; aromatic ring-containing mercaptans; and so on. Examples of such chain transfer agents also include, but are not limited to, dodecanethiol, butanethiol, isooctyl-3-mercaptopropionate, 2-methyl-5-t-butyl-thiophenol, carbon tetrachloride, carbon tetrabromide and the like. The terms, "mercaptan," and, "thiol," may be used interchangeably to mean C—SH group.

Based on total weight of monomers to be polymerized, a chain transfer agent may be present in an amount from about 0.1% to about 7% although may be present in greater or lesser amounts.

In embodiments, a branching agent optionally may be included to control branching structure of a target latex. Exemplary branching agents include, but are not limited to, decanediol diacrylate (ADOD), trimethylolpropane, pentaerythritol, trimellitic acid, pyromellitic acid and mixtures thereof.

Based on total weight of monomers to be polymerized, a branching agent may be present in an amount from about 0% to about 2%, although may be present in greater or lesser amounts.

In a latex process and a toner process of the disclosure, emulsification may be done by any suitable process, such as, mixing, optionally, at elevated temperature. For example, an emulsion mixture may be mixed in a homogenizer set at about 200 to about 400 rpm and at a temperature of from about 20° C. to about 80° C. for a period of from about 1 min to about 20 min, although speed, temperature and time outside of those ranges can be used.

Any type of reactor may be used without restriction. A reactor can include means for stirring compositions therein, such as, an impeller. A reactor can include at least one impeller. For forming a latex and/or toner, a reactor can be operated throughout a process such that impellers operate at a mixing rate of about 10 to about 1,000 rpm.

Following completion of monomer addition, a latex may be permitted to stabilize by maintaining conditions for a period of time, for example, for about 10 to about 300 min, before cooling. Optionally, a latex formed by an above process may be isolated by standard methods known in the art, for example, coagulation, precipitation, centrifugation, filtering, washing, drying or the like.

A latex of the present disclosure may be melt blended or otherwise mixed with various toner ingredients, such as, an optional wax dispersion, an optional colorant, an optional additional resin, an optional coagulant, an optional silica, an optional charge enhancing additive or charge control additive, an optional surfactant, an optional emulsifier, an optional flow additive and the like. Optionally, a latex (e.g. around 40% solids) may be diluted to a desired solids loading (e.g. about 12 to about 15% by weight solids), before formulated in a toner composition.

Methods of producing latex resins may be carried out as described in U.S. Pat. No. 7,524,602, the entire content of which herein is incorporated by reference in entirety.

c) Optional Colorants

In embodiments, toner particles optionally may comprise one or more colorants. In other embodiments, toner particles may be colorless or clear. Various known suitable colorants, such as dyes, pigments, mixtures of dyes, mixtures of pigments, mixtures of dyes and pigments and the like may be included in a toner. Colorant may be included in a toner in an amount of for example, 0 to about 35% by weight of a toner, although amounts outside that range may be utilized.

Examples of suitable colorants include carbon black, such as, REGAL 330®; magnetites, such as, Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like. Colored pigments can be cyan, magenta, yellow, red, green, brown, blue or mixtures thereof. Pigment or pigments can be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™, PIGMENT BLUE™ available from Paul Uhlich & Company, Inc., PIGMENT VIOLET 1™, PIGMENT RED 48™, LEMON CHROME YELLOW DCC 1026™, E. D. TOLUIDINE RED™ and BON RED C™ available from Dominion Color Corp., Ltd., Toronto, Calif., NOVAPERM YELLOW FGL™, HOSTAPERM PINK E™ from sanofi, CINQUASIA MAGENTA™ available from E.I. DuPont de Nemours & Co. and the like. Colorants that can be selected are black, cyan, magenta, yellow and mixtures thereof. Examples of magenta colorants are 2,9-dimethyl-substituted quinacridone and anthraquinone dye identified in the Color Index (CI) as CI 60710, CI Dispersed Red 15, diazo dye identified in the Color Index as CI 26050, CI Solvent Red 19 and the like. Illustrative examples of cyans include copper tetra(octadecyl sulfonamide) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™, and cyan components also may be selected as colorants. Other known colorants can be selected, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G01 (sanofi), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (sanofi), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (sanofi), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann, CA), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like.

d) Optional Wax

A toner of the present disclosure optionally may contain a wax, which can be either a single type of wax or a mixture of two or more different waxes. When included, wax may be present in an amount of, for example, from about 1 wt % to about 25 wt % of a toner particles. The melting point of a wax can be at least about 60° C., at least about 70° C., at least about 80° C. Waxes that may be selected include waxes having, for example, a weight average molecular weight of from about 500 to about 20,000, from about 1,000 to about 10,000. Wax particles can be from about 125 nm to about 250 nm, from about 150 to about 225 nm, from about 175 to about 200 nm in size.

Waxes that may be used include, for example, polyolefins, such as, polyethylene, polypropylene and polybutene waxes, such as, commercially available from Allied Chemical and Petrolite Corporation, for example, POLYWAX™, polyethylene waxes from Baker Petrolite, wax emulsions available from Michaelman, Inc. and the Daniels Products Company, EPOLENE N-15™ commercially available from Eastman Chemical Products, Inc., VISCOL 550-P™, a low weight average molecular weight polypropylene available from Sanyo Kasei K. K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax, microcrystalline wax and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate, pentaerythritol tetra behenate; ester waxes obtained from higher fatty acid and multivalent alcohol multimers, such as, diethyleneglycol monostearate, dipropyleneglycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™ and SUPERSLIP 6530™ available from Micro Powder Inc., fluorinated waxes, for example, POLYFLUO 190™, POLYFLUO 200™, POLYSILK 19™ and POLYSILK 14™ available from Micro Powder Inc., mixed fluorinated, amide waxes, for example, MICROSPERSION 19™ available from Micro Powder Inc., imides, esters, quaternary amines, carboxylic acids or acrylic polymer emulsion, for example JONCRYL 74™, 89™, 130™, 537™ and 538™, all available from SC Johnson Wax, chlorinated polypropylenes and polyethylenes available from Allied Chemical and Petrolite Corporation and SC Johnson wax and so on. Mixtures and combinations of the foregoing waxes also may be used in embodiments.

e) Toner Preparation

Toner particles may be prepared by any method within the purview of one skilled in the art. Although embodiments relating to toner particle production are described below with respect to emulsion aggregation (EA) processes, any suitable method of preparing toner particles may be used, including chemical processes, such as, suspension and encapsulation processes disclosed in U.S. Pat. Nos. 5,290,654 and 5,302,486, the entire disclosure of each of which herein is incorporated by reference in entirety.

Toner compositions may be prepared by EA processes, such as, a process that includes aggregating a sulfopolyester-metal ion nanoparticle composite resin, an optional second toner resin, an optional wax, an optional colorant and any other desired or required additives to form a mixture, for example, in a batch reactor or a continuous reactor. The pH of the resulting mixture may be adjusted by an acid, such as for example, acetic acid, nitric acid or the like. In embodiments, the pH of a mixture may be adjusted to from about 2 to about 4.5. Additionally, in embodiments, a mixture may be homogenized. Homogenization may be accomplished by mixing at about 600 to about 4,000 revolutions per minute (rpm). Homogenization may be accomplished by any suitable means, including, for example, with an IKA ULTRA TURRAX T50 probe homogenizer.

A sulfopolyester-metal ion nanoparticle composite resin is mixed with optional other resin(s) and optional surfactant to form a resin emulsion. Based on total toner weight, a latex may be present in an amount from about 50% to about 98%, although may be present in lesser amounts. Resin particles can have a size from about 100 nm to about 250 nm, from about 120 nm to about 230 nm, from about 130 nm to about 220 nm, although particle size can be outside of those ranges. Resin particles then can be combined with any optional wax, any optional colorant and other toner reagents as a design choice to form core particles.

Following preparation of the above mixture, an aggregating agent (or coagulant or flocculent) may be added to form aggregated core particles. Suitable aggregating agents include, for example, aqueous solutions of a divalent cation or a multivalent cation. An aggregating agent may be, for example, polyaluminum halides, such as, polyaluminum chloride (PAC), or the corresponding bromide, fluoride or iodide, polyaluminum silicates, such as, polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof. In embodiments, an aggregating agent may be added to a mixture at a temperature that is below the glass transition temperature ($T_g$) of a resin.

An aggregating agent may be added to s mixture to form toner in an amount of, for example, from about 0.1 parts per hundred (pph) to about 5 pph, from about 0.25 pph to about 4 pph.

To control aggregation of particles, an aggregating agent may be metered into a mixture over time. For example, an agent may be metered into a mixture over a period of from about 5 to about 240 min. Addition of an agent also may be done while a mixture is maintained under stirred conditions, in embodiments, from about 50 rpm to about 1,000 rpm, and at a temperature that is below the $T_g$ of a resin.

Aggregation thus may proceed by maintaining an elevated temperature, or slowly raising the temperature to, for example, from about 40° C. to about 100° C., and holding the temperature for a time from about 0.5 hr to about 6 hr, while maintaining stirring, to provide aggregated core particles.

Core particles may be permitted to aggregate until a predetermined desired particle size is obtained. Particle size can be monitored as known in the art, for example, with a COULTER COUNTER, for average particle size. In embodiments, the particle size may be from about 4 to about 7 μm.

Once a desired final size of toner particles is achieved, pH of a mixture may be adjusted with a base to a value of from about 6 to about 10, from about 5 to about 8. Adjustment of pH freezes, that is, stops, toner growth. Base utilized to stop toner growth may include any suitable base, such as, for example, alkali metal hydroxides, such as, for example, sodium hydroxide, potassium hydroxide, ammonium hydroxide, combinations thereof and the like. In embodiments, an agent, such as, ethylenediamine tetraacetic acid (EDTA) or equivalent functional compounds, may be added to adjust pH to the desired value noted above.

f) Optional Shell

In embodiments, a shell may be applied to formed toner particles. Any resin described above or as known in the an as suitable for a core resin may be utilized as a shell resin, such as, a polyester resin or a (sulfo)polyester-metal nanoparticle composite resin. A shell resin may be applied to aggregated particles by any method within the purview of those skilled in the art. In embodiments, a shell resin may be in an emulsion including any surfactant described herein. Aggregated particles may be combined with said emulsion so that the resin forms a shell over the formed aggregates. In embodiments, an amorphous polyester may be utilized to form a shell over aggregates to form toner particles having a core-shell configuration.

Toner particles can have a diameter of from about 3 to about 8 μm, from about 4 to about 7 μm, and the optional shell may comprise about 5 to about 50% by weight of toner particles, although an amount can be outside of that range. A thicker shell may be desirable to provide charging characteristics due to a higher surface area of a toner particle. Thus, a shell resin may be present in an amount from about 30% to about 70% by weight of toner particles. In embodiments, a shell has a higher $T_g$ than aggregated toner particles. A shell can carry one or more toner components, such as, a charge control agent, a colorant, such as, a carbon black, a silica and so on.

In embodiments, a photoinitiator may be included in a resin mixture for forming a shell. Thus, a photoinitiator may be in a core, a shell or both. A photoinitiator may be present in an amount of from about 1% to about 5% by weight of toner particles. A shell resin can contain a branching agent.

In embodiments, a metal nanoparticle is reduced on the surface of a toner core particle by exposing a toner particle to a metal ion source, such as those disclosed herein or as known in the art, and a reducing agent, such as those disclosed herein or as known in the art.

As disclosed hereinabove, a shell may cover the entire surface of a particle or any portion thereof. Hence, a toner shell may encapsulate a toner core particle, or a shell may be found on a portion or on portions of the surface of a core particle.

g) Optional Coalescence

Following aggregation to a desired particle size, optionally with formation of a shell over or on a toner core particle as described above, particles then may be coalesced to a desired final shape, coalescence being achieved by, for example, heating a mixture to a temperature of from about 55° C. to about 100° C. Higher or lower temperatures may be used, it being understood that temperature can be a function of resins used.

Coalescence may proceed over a period of from about 1 min to about 9 hr, although times outside of that range can apply, for example, depending whether coalescence occurs in a batch reactor or in a microreactor.

In a continuous system or reactor, or a microreactor, reduced volumes of reagents are coursed in a unidirectional manner through a reactor. For example, aggregated particles and reactants, often in a slurry, from a batch or a continuous reactor are fed continuously, discontinuously or metered at controllable rates and in controllable amounts by communicating devices, such as, lines, conduits, tubing and so on, composed of suitable materials, to and for incubation in a continuous reactor. Communicating devices can comprise and a continuous reactor comprises one or more devices for controlling temperature of contents therein, such as, a heating or cooling element. Heating and cooling elements can be positioned along the communication devices and along the flow path of a continuous reactor to provide a controlled or particular temperature profile for communicated reactants within a communication device and a reactor or reactor unit and an aggregated particle slurry in a continuous reactor. A pump or urging device can cause movement of a slurry from a batch reactor to and through a continuous reactor. A continuous reactor can comprise other urging devices to maintain a desired flow rate therethrough.

A continuous reactor can comprise a series of tubes, channels, voids, tubular voids, voids within partially flattened or ovoid tubes and the like, any suitable flow path, wherein plural such continuous reactors can be connected in parallel, for example, via a manifold, to provide in series a continuous directed flow path through a plurality of devices that comprise a reactor, where environments within a device can vary. Temperature regulating devices, such as, a heating or cooling element, can comprise a liquid, such as, an oil, that bathes a directed flow path in parallel to provide appropriate temperature or temperature profile along a flow path under which a reaction occurs. A flow path can be connected to an egress device by a communication device, such as, a line, conduit, tubing and the like to course a reacted mixture to a product receiving vessel. A reaction apparatus can be operated under pressure to reduce reagent and fluid boiling points and to ensure unimpeded or continuous movement and uniform flow of a reaction mixture through a reactor.

In embodiments, a continuous reactor of interest comprises a plurality of units comprising, for example, about four regions, flow paths, fluid flow paths, zones, subparts, sections and the like, where each region, zone and the like provides a different environment or different conditions for a slurry contained therein, such as, one region provides a ramping of conditions for coalescence and another subsequent zone can be one where coalescence of particles occurs. In embodiments, a reactor comprises multiple units, parts, components and the like that are connected operably to provide a continuous flow path, where each unit provides a different environment for a contained slurry, and which is where a separate process of toner particle development occurs.

After coalescence, a mixture may be cooled to room temperature (RT), such as, from about 20° C. to about 25° C. Cooling may be rapid or slow, as desired. A suitable cooling method may include introducing cold water to a jacket around a reactor or expelling toner from a reactor into chilled water. After cooling, a toner particles optionally may be washed with water and then en dried. Drying may be accomplished by any suitable method, for example, freeze drying.

h) Additives

Toner particles also may contain optional additives, as desired or required. For example, toner may include any known charge additives in amounts of from about 0.1 to about 10 wt %, from about 0.5 to about 7 wt % of a toner. Examples of such charge additives include alkyl pyridinium halides, bisulfates, the charge control additives of U.S. Pat. Nos. 3,944,493, 4,007,293, 4,079,014, 4,394,430 and 4,560,635, the entire disclosure of each of which herein is incorporated by reference in entirety, negative charge enhancing additives, such as, aluminum complexes, and the like.

Other examples of such surface additives include, for example, metal salts, metal salts of fatty acids, colloidal silicas, metal oxides, strontium titanates, mixtures thereof and the like. Surface additives may be present in an amount of from about 0.1 to about 10 wt %, from about 0.5 to about 7 wt % of a toner. Examples of such additives include those disclosed in U.S. Pat. Nos. 3,590,000, 3,720,617, 3,655,374 and 3,983,045, the entire disclosure of each of which herein is incorporated by reference in entirety. Other additives include zinc stearate and AEROSIL R972® (Degussa). The coated silicas of U.S. Pat. Nos. 6,190,815 and 6,004,714, the disclosure of each of which herein is incorporated by reference in entirety, also can be present in an amount of from about 0.05 to about 5%, from about 0.1 to about 2% of the toner, which additives can be added during aggregation or blended into a formed toner product.

Surface additives can be added to a toner composition after washing or drying.

Characteristics of a toner particle may be determined by any suitable technique and apparatus. Volume average particle diameter, $D_{50v}$, number average particle diameter, $D_{16n}$, $D_{50n}$, $GSD_v$, $GSD_n$, and so on are examples of useful parameters of characterizing particles and particle populations. Some metrics may be obtained by means of a measuring instrument, such as, a Beckman Coulter MULTISIZER 3, operated as recommended by the manufacturer. Cumulative particle distributions can be used to obtain various population parameters, which can be used to determine or to estimate for example, median size, amount of coarse particles, amount of fine particles and so on. For example, relative amount of fine particles can be determined from the $D_{50n}/D_{16n}$ value, which can be less than about 1.25, less than about 1.24, less than about 1.23, or lower. The percent of fine particles in the populations can be less than about 3.5%, less than about 3%, less than about 2.5%, or lower.

In embodiments, toners of the present disclosure may be utilized as low melt toners, such as, ultra low melt (ULM) toners, with a fusing temperature of for example, less than about 110° C. In embodiments, dry toner particles, exclusive of external surface additives, may have the following characteristics:

(1) circularity of from about 0.9 to about 1 (measured with, for example, a Sysmex 3000), from about 0.95 to about 0.99, from about 0.96 to about 0.98;

(2) $T_g$ of from about 45° C. to about 60° C. from about 48° C. to about 55° C.; and/or (3) melt flow index (MFI) in g/10 min (5 kg/130° C.) of from about 79.0 to about 172.5.

Gloss of a toner may be influenced by amount of retained metal ion, such as $Al^{3+}$, in a particle. In embodiments, amount of retained metal ion, for example, $Al^{3+}$, in toner particles of the present disclosure may be from about 0.001 pph to about 1 pph, from about 0.003 pph to about 0.5 pph.

D) Developers

Toner particles thus formed may be formulated into a developer composition. For example, toner particles may be mixed with carrier particles to achieve a two component developer composition. Toner concentration in a developer may be from about 1% to about 25% by weight of the total weight of a developer, with the remainder being carrier. However, different toner and carrier percentages may be used to achieve a developer composition with desired characteristics.

a) Carriers

Examples of carrier particles for mixing with toner particles include particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, carrier particles may include a core with a coating thereover, which may be formed from a polymer or a mixture of polymers that are not in close proximity thereto in the triboelectric series, such as, those as taught herein, or as known in the art. Coating may include fluoropolymers, terpolymers of styrene, silanes and the like. A coating may have a weight of, for example, from about 0.1 to about 10% by weight of a carrier.

Various means can be used to apply a polymer to a surface of a carrier core, for example, cascade roll mixing, tumbling, milling, shaking, electrostatic powder cloud spraying, fluidized bed mixing, electrostatic disc processing, electrostatic curtain processing and the like. A mixture of carrier core particles and polymer then may be heated to enable polymer to melt and to fuse to the carrier core. Coated carrier particles then may be cooled and thereafter classified to a desired particle size.

E) Imaging and Manufacturing Devices

Toners may be used for electrostatographic or electrophotographic processes, including those disclosed in U.S. Pat. No. 4,295,990, the entire disclosure of which herein is incorporated by reference in entirety. In embodiments, any known type of image development system may be used in an image developing device, including, for example, magnetic brush development, jumping single component development, hybrid scavengeless development (HSD), 3D printers (including those disclosed, in U.S. Pat. Nos. 5,204,055; 7,215,442; and 8,289,352) or any other type of printing apparatus that is capable of applying and fusing a toner on a substrate or to form an article of manufacture. Those and similar development systems are within the purview of those skilled in the art.

Color printers commonly use one to four, or more housings carrying different colors to generate fall color images based on black plus the standard printing colors, cyan, magenta and yellow. However, in embodiments, additional housings may be desirable, including image generating devices possessing five housings, six housings or more, thereby providing additional toner colors to print an extended range of colors (extended gamut) and to provide a clear coat or coating.

Thermoplastic and thermosetting styrene and acrylate polymers can be used for 3-D printing by any of a variety of materials and methods, such as, selective heat sintering, selective laser sintering, fused deposition modeling, robocasting and so on. A resin can be formed into sheets for use in laminated object manufacturing. In embodiments, a resin is configured as a filament. Granular resin can be used in selective laser melting methods. Ink jet devices can deliver resin.

Examples of polymers include acrylonitrile butadiene styrene, polyethylene, polymethylmethacrylate, polystyrene and so on. In embodiments, polymers can be mixed with an adhesive to promote binding. In embodiments, an adhesive layer is interleaved with a layer of cured or hardened polymer to bind leafs or layers.

A polymer may be configured to contain a compound that on exposure to a stimulant decomposes and forms one or more free radicals which promote polymerization of a polymer of interest, such as, forming branches, networks and covalent bonds. For example, a polymer can comprise a photoinitiator to induce curing on exposure to white light, an LED, UV light and so on. Such materials can be used in stereolithography, digital light processing, continuous liquid interface production and so on.

Waxes and other curing material can be incorporated into a 3D-forming composition or can be provided as a separate composition for deposition on a layer of a resin of interest or between layers of a resin of interest.

For example, a selective laser sintering powder, such as, a polyacrylate or polystyrene, is placed in a reservoir atop of a delivery piston. Granular resin is transferred from the reservoir to the delivery piston to a second void comprising a fabrication piston which carries the transferred resin in the form of a thin layer. The thin layer then is bonded, for example, exposed to a light or a laser tuned to melt and to fuse selected sites of the layer of resin particles. A second layer of resin granules is added from the reservoir to the fabrication void onto the fused layer of toner on the fabrication piston and the laser again melts and fuses selected portions of the second or subsequent layer of granules. The heating and fusion is of an intensity and strength to enable heating and fusing of sites from the second layer to sites of the first layer, thereby forming a growing solid structure of defined shape in the vertical direction. In embodiments, an adhesive or binder is applied to the fused first layer before the unfused granular resin for the second layer is applied. When all of the layers are applied one on another and selected portions thereof are fused or bonded and hence, completed, the unfused resin powder is removed from the multiple layers of fused toner leaving, the fused granules in the form of a designed structure. Such a manufacturing method is an additive process as successive layers of a structure are laid down consecutively.

F) Methods for Forming Images or Structures

In embodiments are provided methods for forming an antibacterial printed image comprising applying present toner to a surface or for fuming a structure.

In embodiments the surface is 2-D (e.g., paper or a label) or 3-D (medical device, such as, a catheter or thermometer). In embodiments, an antibacterial printed image is a clear coat formed with a clear toner (colorless) and applied over a surface to provide an antimicrobial coating on as surface. A clear coat may be applied over an earlier printed image or may be applied as a coating to a 3-dimensional surface, such as, a medical instrument. In embodiments, an antimicrobial printed image is formed with a color toner to provide an antimicrobial image, such as, a label or UPC code. A color antimicrobial printed image may be a printed code, a printed text or a printed logo.

Toner may be applied to a surface by fusing at a temperature that adheres toner to a surface and does not diminish or destroy antimicrobial properties of a toner, see Example 5. In embodiments, toner is fused at an elevated temperature, for example, at least about 50° C. above RT. Fusing temperature can be from about 80° C. to about 130° C. from about 85° C. to about 120° C. from about 90° C. to about 110° C., less than about 120° C., less than about 115° C., less than about 110° C., or lower.

In embodiments, toner is one which is amenable to fusing without an elevated temperature, a cold fusing process, for example, that relies on, for example, pressure, to fuse toner to a surface, to a substrate or to a preexisting fused layer of toner. Hence, fusing can occur at a temperature less than about 40° C., less than about 35° C., less than about 30° C., less than about 25° C., or lower.

In embodiments, surface is selected from a paper, a plastic, a textile, a ceramic, a metal, a rock and so on. An antimicrobial printed image, color or clear coat, may be affixed to a menu, a medical device, medical equipment, food packaging, cosmetic packaging, cosmetic products, food preparation products, kitchen products, heating or cooling ductwork, building materials, insulation products or clean room surfaces.

The following Examples illustrate embodiments of the disclosure. The Examples are intended to be illustrative only and are not intended to limit scope of the disclosure. Also, parts and percentages are by weight unless otherwise indicated. As used herein, "RT," refers to a temperature of from about 20° C. to about 30° C.

EXAMPLES

Example 1: Synthesis of Branched Sodio Sulfonated Amorphous Polyester (BSPE) Resin An amorphous BSPE resin comprised of 0.425 mole equivalent of terephthalate, 0.080 mole equivalent of sodium 5-sulfoisophthalic acid, 0.4501 mole equivalent of 1,2-propanediol and 0.050 mole equivalent of diethylene glycol, was prepared as follows. In a one liter Parr reactor equipped with a heated bottom drain valve, high viscosity double turbine agitator and distillation receiver with a cold water condenser were charged 388 g of dimethylterephthalate, 104.6 g of sodium 5-sulfoisophthalic acid, 322.6 g of 1,2-propanediol (1 mole excess), 48.98 g of diethylene glycol, (1 mole excess), trimethylolpropane (5 g) and 0.8 g of butyltin hydroxide oxide as catalyst. The reactor was heated to 165° C. with stirring for 3 hrs and then heated to 190° C. over a one hour period, after which the pressure was reduced slowly from atmospheric pressure to about 260 Torr over a one hr period, and then reduced to 5 Torr over a two hour period. The pressure then was reduced to about 1 Torr over a 30 min period and the polymer was discharged through the bottom drain onto a container cooled with dry ice to yield 460 g of sulfonated polyester resin. The branched sulfonated polyester resin had a $T_g$ of 54.5° C. (onset) and a softening point of 154° C.

Example 2: Synthesis of a BSPE-Silver Nanoparticle Composite

The reaction was carried out in a 3-necked, 500 mL round bottom flask equipped with an overhead stirrer, reflux condenser, thermocouple, hot plate and nitrogen entrance (the condenser acted as the nitrogen exit). About 320 mL of deionized water (DIW) were charged into the flask at RT (22° C.). The heat was raised to 90° C. and nitrogen was run through the system (rpm=250). Once the temperature stabilized, 100 g of solid BSPE from Example 1 were added to the reactor as a finely ground powder (rpm=300). The solution became hazy and had a blue tint. After 1.5 hrs., 1 g AgNO$_3$ dissolved in 6 mL DIW were added dropwise to the solution at a rate of about 1 drop/sec (rpm=387). The solution became slightly darker (brownish). After 10 min, 52.5 mL of 1% (w/w %) trisodium citrate solution (reducing agent) were added to the system dropwise at a rate of 1 drop per second. Then, the solution was stirred at 90° C. for 2 hr (rpm=300). The solution was allowed to cool to RT (rpm=386). The final appearance was a light brown, opaque solution. The solids content was 27.7%, the $D_{50}$ was 69.6 nm, the pH was 4.77 and the ζ potential was −58.6 mV with a ζ deviation of 7.87 mV (breadth of distribution). The percentage of silver m the BSPE-AgNP composite was 0.28% or 0.0235 M. The amount of silver present in the resin was 2413 ppm by inductively coupled plasma (ICP) mass spectrometry or 0.2413%.

Example 3: Synthesis of Silver Nanoparticles

In a 250 mL beaker were added DIW and AgNO$_3$ (equivalent to 1 M silver nitrate solution). The solution was brought to a boil on a hot plate while stirred with a magnetic stir bar. Once the solution was boiling, a solution of trisodium citrate dehydrate was added dropwise at about 1 drop per second. The beaker then was covered with a watch glass and boiled for an additional 15 min. The solution then was taken off the hot plate, cooled to ambient temperature, Turkevich et al. (Disc. Farad. Soc. 11:55-75, 1951) and the precipitate collected.

Example 4: Synthesis of Resin Particles with Silver Nanoparticles in the Shell

In a 2 L glass reactor, the silver nanoparticle resin of Example 2 is added to DIW and the slurry is homogenized using an IKA ULTRA TURRAX T50 homogenizer operating at about 3,000-4,000 rpm. The reactor is transferred to a heating mantle; the rpm is set to 250 and the mixture is heated to about 50° C. Then, the AgNP's of Example 3 are added to the reactor over 5 min. The reactor is heated to 52° C. and the resin particles shelled with silver are recovered.

Example 5: Synthesis of Resin Particles with Silver Nanoparticles in the Shell

The reaction is carried out in a 3-necked round bottom flask equipped with an overhead stirrer, reflux condenser, thermocouple, hot plate and nitrogen entrance (the condenser acted as the nitrogen exit). DIW is charged into the flask at RT (22° C.). The heat is raised to 90° C. and nitrogen is run through the system (rpm=250). Once the temperature stabilized, the solid BSPE of Example 2 is added to the reactor as a finely ground powder (rpm=300). After 1.5 hrs., AgNO$_3$ dissolved in DIW is added dropwise to the solution at a rate of approx. 1 drop/sec (rpm=375). After 10 min, a trisodium citrate solution (reducing agent) is added to the system dropwise at a rate of 1 drop per second. Then, the solution is stirred at 90° C. for 2 hr (rpm=300). The solution is allowed to cool to RI (rpm=386) and the particles separated.

Example 6: Preparation of Polyester Toner with BSPE-AgNP Composite Polymer Resin Into a 500 liter glass reactor were added 108.3 g of DIW with 108.3 g of BSPE-AgNP composite of Example 2 for a total solids of 13.85%. The reactor was fitted with a mechanical agitator and equipped with a single pitched blade impeller. The mixture was agitated at 250 rpm and heated via an electric heating mantle to 55° C. After 20 min, once the temperature of the solution reached 55° C., the rpm was increased to 400 and a zinc acetate solution (3 g of zinc acetate dihydrate in 60 g of DIW) was added incrementally. After 40 min, all the zinc acetate solution was added and the temperature was increased to 56° C. The toner particle size, as measured by a COULTER COUNTER, was found to be 2.07 μm with a geometric standard deviation $GSD_v$ of 1.285 and $GSD_n$ of 1.246. The temperature was increased to 57° C. and particle growth was monitored via COULTER COUNTER. After 45 min, the heat was turned off and the reactor contents were cooled to RT. The final toner particle size was 2.37 μm with a $GSD_v$ of 1.306 and a $GSD_n$ of 1.306. The toner was discharged from the reactor and the particles filtered from the mother liquor and washed 2 times with DIW. The toner was dispersed in DIW and stored.

Example 7: Preparation of Polyester Toner with BSPE-AgNP Composite Polymer Resin The materials and method of Example 6 are practiced except the silver coated resin particles of Example 4 and Example 5 are used. The toners are discharged from the reactor, the particles filtered from the mother liquor and washed 2 times with DIW. The two toners are dispersed in DIW and stored.

Example 8: Preparation of BSPE Toner with AuNP's on the Surface of the Toner

The reaction was carried out in a 3-necked, 500 mL round bottom flask equipped with an overhead stirrer, reflux condenser, thermocouple and electric heating mantle. One hundred g of 6.25% BSPE emulsion (Example 1) and 100 g of DIW were added to the flask and heated to 56° C. while stirring at 300 rpm. Then, 1.5 g of zinc acetate dissolved in 30 g DIW were added to the reactor using a pump at a rate of 0.7 mL/min. Zinc acetate addition was complete after 2 hr at which point the particle size ($D_{50}$) as measured by the NANOTRAC device was 1.913 μm. The reactor continued to be heated at 56° C. over the course of 3 days while the particle size was monitored hourly using the NANOTRAC for $D_{50}$<2 μm and the COULTER COUNTER for $D_{50}$>2 μm. Stir rate was reduced gradually to 140 rpm to accelerate particle growth. After 1080 hr, particle size measured by the COULTER COUNTER was 4.353 μm with a $GSD_v$ of 1.164 and a $GSD_n$ of 1.17. The mean circularity of the particles as measured by the FPIA-3000 was 0.948.

The temperature was reduced to 48° C. and 0.5 g of AgNO$_3$ (4% wt per BSPE) dissolved in 50 mL DIW were added to the reactor at a rate of approx. 0.5 mL/min (rpm=300). The solution became slightly pink. After 2 hr, 30 mL of 1% trisodium citrate solution (reducing agent) were added to the reactor at a rate of approx. 0.4 mL/min (rpm=300). Then, the solution was allowed to cool overnight to RT (rpm=180) and then passed through a 25 μm sieve. The final appearance of the emulsion was a light pink opaque solution. The solids content of the emulsion was 3.48%, the $D_{50}$ was 4.353 μm and the ζ potential was −57.3 mV with a ζ deviation of 4.86 mV (breadth of distribution). Energy dispersive spectroscopy-scanning electron microscopy (EDS-SEM) confirmed the presence of silver on the surface of the toner particles, as compared to a control sample taken from the same reaction prior to silver addition.

Example 9: Preparation of BSPE Toner with AgNP's on the Surface of the Toner Additional toner particle samples were prepared following the protocol of Example 8, except that in one sample, 1.25 g of AgNO$_3$ (10% AgNO$_3$ per BSPE) were used in the reduction reaction, and in another sample, 0.125 g AgNO$_3$ (1% AgNO$_3$ per BSPE) were added to the reaction.

Example 10: Preparation of Toner with AgNP's on the Surface of the Toner

The materials and method of Example 8 are practiced except the resin particles of Example 4 and Example 5 are used. The temperature of the reactions is reduced to 48° C. and AgNO$_3$ (4% wt per BSPE) dissolved in DIW is added to the reactors at a rate of approx. 0.5 mL/min (rpm=300). After 2 hr, a trisodium citrate solution is added to the reactors at a rate of approx. 0.4 mL/min (rpm=300). Then, the solutions are allowed to cool overnight to RT (rpm=180) and then passed through a 25 µm sieve and the two toners stored in water.

Example 11: Preparation of Toner with Composite Resin on the Surface of the Toner The materials and method of Example 8 are practiced except the resin particles of Example 4 and Example 5 are used. When the core particle size of interest is obtained, the sulfonated resin-metal ion composite of Example 2 is added to the reactors to form a shell. The particles are coalesced, washed and the two toners collected.

Example 12: Wet Deposition of Antimicrobial Toner to Mimic Toner Transfer and Fusing A suspension of toner from Example 6 was prepared in water containing a small amount of Triton X-100 surfactant. An amount of the suspension corresponding to 9.62 mg of toner particles was passed through a glass microfiber membrane with an exposed surface area of 9.62 cm$^2$. The retained particles and microfiber membrane were dried at RT, then enveloped in MYLAR film and passed through a laminator set to 120° C.

Microfiber samples were placed on a bacterial lawn. Results after 3 days of incubation at 37° C. confirmed that the BSPE-AgNP toner showed no bacteria growth around the fused toner swatch or on the swatch. The zone of inhibition or halo is large which means that silver ions are released from the toner and diffuse into the agar over the 3-day period. It is possible that the more porous structure of the branched sulfonated polyester as compared to a rigid styrene/acrylate-type toner better facilitated diffusion of silver from the toner. As well, the polyester toner binder has hydrolysable ester bonds which are biodegradable while vinyl/acrylate polymers, such as, styrene/acrylate polymers, generally are not as susceptible to hydrolysis or biodegradation thereby making those toner particles more resistant to microbial degradation. It is reported that negatively charged carboxylic acid groups help diffusion of silver to improve antibacterial activity (Kundu et al., New J. Chem., 2002, 26, 1081-1084). The negatively charged sulfonate moieties of BSPE act in a similar fashion.

Example 13: Wet Deposition of Antimicrobial Toner to Mimic Toner Transfer and Fusing Toner samples front Example 8 were diluted in DIW and wet deposited onto VWR 410 qualitative filter paper at a toner mass area (TMA) of either 0.45 mg/cm$^2$ or 1 mg/cm$^2$ after pretreating the paper with 0.1M HCl. The filters were left to dry at RT overnight then enveloped in MYLAR film and passed through a laminator set to 55° C., 65° C., 75° C., 85° C. or 95° C. Small circles were cut from the fused filters with a 3-hole punch and placed face down on agar plates inoculated with bacteria cultured from saliva. Plates were incubated at 37° C. overnight.

After 24 hr of incubation, a distinct zone of inhibition was seen around swatches with a TMA of 1 mg/cm$^2$ at all fusing temperatures tested.

Example 14: Dose Response of Wet Deposition Toner

Toner samples from Examples 8 and 9 were wet deposited onto VWR410 qualitative filter paper pretreated with 0.1 M HCl at a TMA of 1 mg/cm$^2$ and fused at 110° C. Small circles were cut from the fused filters with a 3-hole punch and placed face down on agar plates inoculated with bacteria cultured from saliva. Plates were incubated at 37° C.

After 72 hr, a distinct zone of inhibition was observed for the toners and the size of the zone of inhibition increased with increasing AgNO$_3$ amount in the toner.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

The entire disclosure of all references cited herein each is incorporated herein by reference in entirety.

We claim:

1. An antimicrobial core-shell resin particle comprising (a) a core comprising a sulfonated polyester resin and a nanoparticle, and (b) a shell on said core comprising a nanoparticle, wherein the nanoparticles of said core and shell comprise silver in a form selected from the group consisting of a silver salt, a silver composite and elemental silver, and further wherein the resin particle has a D$_{50}$ mass median diameter of about 5 nm to about 500 nm.

2. The resin particle of claim 1, wherein said shell encapsulates said core.

3. An antimicrobial core-shell resin particle comprising (a) a core comprising a sulfonated polyester resin and a metal ion nanoparticle, and (b) a shell on said core comprising a metal ion nanoparticle, wherein the resin particle has a D$_{50}$ mass median diameter of about 5 nm to about 500 nm, and further wherein said metal ion nanoparticles of said core and shell comprise a silver salt.

4. A core-shell toner particle comprising a toner core comprising the core-shell resin particle of claim 3, and optionally, a toner shell on a surface of the toner core, the toner shell comprising a metal ion nanoparticle, wherein said metal ion nanoparticle of the toner shell comprises a silver salt.

5. The toner particle of claim 4, further comprising a colorant, a wax or both.

6. The toner particle of claim 4, further comprising a sulfonate-free resin.

7. The toner particle of claim 4, further comprising a polyester polymer.

8. The toner particle of claim 4, further comprising a styrene/acrylate polymer.

9. The toner particle of claim 4, wherein said toner shell comprises a polymer.

10. The toner particle of claim 4, wherein said toner shell encapsulates said toner core.

11. The resin particle of claim 3, wherein said shell encapsulates said core.

12. The resin particle of claim 3, wherein said sulfonated polyester resin comprises lithium, potassium or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate) and copoly(ethylene-neopentylene-5-sulfoisophthalate)-copoly-(ethylene-neopentylene-terephthalatephthalate).

13. The resin particle of claim 1, wherein said sulfonated polyester resin comprises a branched polymer.

14. The resin particle of claim 1, wherein said sulfonated polyester resin comprises lithium, potassium or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate) and copoly(ethylene-neopentylene-5-sulfoisophthalate)-copoly-(ethylene-neopentylene-terephthalatephthalate).

* * * * *